United States Patent
Lautenschlaeger et al.

(10) Patent No.: US 8,015,842 B2
(45) Date of Patent: Sep. 13, 2011

(54) METHOD OF MAKING A FLOAT GLASS SUBSEQUENTLY CONVERTIBLE INTO A GLASS CERAMIC

(75) Inventors: Gerhard Lautenschlaeger, Jena (DE); Andreas Langsdorf, Ingelheim (DE); Ulrich Lange, Mainz (DE); Bernd Ruedinger, Woerrstadt (DE); Klaus Schneider, Apolda (DE); Michael Jacquorie, Rheinboellen (DE); Friedrich Siebers, Nierstein (DE); Wolfgang Schmidbauer, Mainz-Finthen (DE)

(73) Assignee: Schott AG, Mainz (DE)

( * ) Notice: Subject to any disclaimer, the term of this patent is extended or adjusted under 35 U.S.C. 154(b) by 966 days.

(21) Appl. No.: 11/485,782

(22) Filed: Jul. 13, 2006

(65) Prior Publication Data

US 2007/0015653 A1 Jan. 18, 2007

(30) Foreign Application Priority Data

Jul. 15, 2005 (DE) .................. 10 2005 033 908

(51) Int. Cl.
*C03B 18/02* (2006.01)
*C03B 18/04* (2006.01)
*C03B 32/00* (2006.01)

(52) U.S. Cl. .................. 65/99.1; 65/95; 65/33.1; 65/85

(58) Field of Classification Search ............... 65/33.1, 65/85, 90–101
See application file for complete search history.

(56) References Cited

U.S. PATENT DOCUMENTS

| | | | | |
|---|---|---|---|---|
| 3,684,475 A * | 8/1972 | Minakov et al. | ............ | 65/182.3 |
| 3,804,608 A * | 4/1974 | Gaskell et al. | ............ | 65/33.8 |
| 3,809,542 A | 5/1974 | Lythgoe et al. | | |
| 3,809,543 A * | 5/1974 | Gaskell et al. | ............ | 65/33.8 |
| 3,841,856 A * | 10/1974 | Bondarev et al. | ............ | 65/33.7 |
| 3,847,582 A * | 11/1974 | Kozmin | ............ | 65/33.3 |
| 3,860,406 A | 1/1975 | Basler et al. | | |
| 4,354,866 A * | 10/1982 | Mouly | ............ | 65/99.5 |
| 4,824,463 A * | 4/1989 | Neuhoff et al. | ............ | 65/33.1 |
| 2002/0023463 A1 * | 2/2002 | Siebers et al. | ............ | 65/99.5 |
| 2005/0143247 A1 | 6/2005 | Siebers et al. | | |
| 2005/0250639 A1 | 11/2005 | Siebers et al. | | |

FOREIGN PATENT DOCUMENTS

| | | |
|---|---|---|
| CN | 1446763 | 10/2003 |
| DE | 2 207 727 | 8/1972 |
| DE | 100 17 701 | 3/2002 |
| EP | 0 080 709 | 6/1983 |
| GB | 1 232 666 | 5/1971 |
| WO | 2005/073138 | 8/2005 |

* cited by examiner

OTHER PUBLICATIONS

Float Glass Production, Tangram Technology Ltd, 2004 (in English).

*Primary Examiner* — Jason L Lazorcik
*Assistant Examiner* — Jodi F Cohen
(74) *Attorney, Agent, or Firm* — Michael J. Striker

(57) ABSTRACT

A method for making a float glass convertible into a glass ceramic, by which a largely crystal fault-free glass can be produced. In this method the glass is cooled from a temperature ($T_{KGmax}$), at which a crystal growth rate is at a maximum value ($KG_{max}$), to another temperature ($T_{UEG}$), at which practically no more crystal growth occurs, with a cooling rate, KR, in ° C. min$^{-1}$ according to:

$$KR_{UEG}^{KG_{max}} \geq \frac{\Delta T_{UEG}^{KG_{max}}}{100} \cdot KG_{max},$$

wherein $\Delta T = T_{KGmax} - T_{UEG}$, and KGmax=maximum crystal growth rate in μm min$^{-1}$. The float glass has a thickness below an equilibrium thickness, a net width of at least 1 m and has no more than 50 crystals with a size of more than 50 μm, especially no crystals with a size of more than 10 μm, per kilogram of glass within the net width.

9 Claims, 2 Drawing Sheets

METHOD OF MAKING A FLOAT GLASS SUBSEQUENTLY CONVERTIBLE INTO A GLASS CERAMIC

CROSS-REFERENCE

The invention disclosed and claimed hereinbelow is also described in German Patent Application 10 2005 033 908.5, which provides the basis for a claim of priority of invention under 35 U.S.C. 119 and whose subject matter is incorporated here by reference thereto.

BACKGROUND OF THE INVENTION

The subject matter of the present invention includes a method of making a float glass that is convertible or transformable into a glass ceramic and the float glass made by the method.

Methods of making float glass are well known. Molten glass is supplied to a metal bath, which usually comprises tin or a tin alloy, is formed into a glass sheet of a predetermined thickness, is guided though zones of different temperature on the metal bath, is cooled on it, and finally continuously drawn off from the metal bath. The glass mass spreads out on the metal bath surface when it is poured on the float bath, until it has reached an equilibrium thickness, which is determined by the density of the glass mass, the density of the tin, and the properties of the boundary surface between the tin and the glass. The thickness of the glass mass on the metal bath surface usually reaches about 7 mm. When thin glass is to be produced, the glass on the melt is drawn. The glass is drawn with the assistance of top rollers, which are placed at different positions on the sheet, in order to reduce the sheet thickness and increase the sheet width. The top rollers are cooled rollers, which are driven with a definite and adjustable rotation speed. By using several top roller pairs in suitable rotation speed stages and angular positions, the thickness of the glass sheet is successfully reduced, without a too great reduction of the sheet width, or even an increase in the sheet width.

To produce good quality glass the temperature of the glass sheet is reduced with a relatively constant and comparatively small cooling rate of about 20 to under 30° C. $min^{-1}$ over a large temperature range of about 200° C. from about 1150° C. to 900° C. A careful temperature control in this temperature range is indispensable. This careful cooling process is required to minimize thickness variations and the fine waviness.

When this process is performed with crystallizable glass compositions, one usually obtains results, which are not sufficient to satisfy the elevated requirements. In the temperature range, in which the glass sheet is processed with a comparatively small cooling rate for the purpose of drawing the glass sheet, crystallization is already occurring, so that the later ceramicizing of the glass, i.e. its conversion into a glass ceramic, in which the glass is first held at a precisely defined temperature for an exact predetermined time interval, which allows crystals to grow after that at a higher temperature, is negatively influenced by the crystals formed during the drawing of the glass sheet in an undesirable manner.

Crystal nuclei or seeds formed during the drawing stage form two types of faults. The first type is a surface defect, which arises by interaction between the glass and the float bath and/or the float bath atmosphere. The second type is a defect within the glass, e.g. a platinum particle from the structural parts of the bath. Crystals can form at these defect locations because of the time required for drawing of the glass sheet.

Two different starting points for solution of this problem are found in the prior art. These two approaches are described in the following paragraphs.

According to U.S. Pat. No. 3,804,608 the glass is rapidly cooled immediately after formation to the crystallization temperature and held there for a comparatively longer time. This process has three disadvantages: first it may be performed only with specially selected glass, second flat glass can only be made with the equilibrium thickness, and third, above all, no definite neat crystal seed formation occurs in the process, since the glass is cooled to a crystal seed formation temperature, which is below the crystal growth temperature.

This latter disadvantage is avoided by a method described in U.S. Pat. No. 3,809,543 (=DE 22 07 727) of the same applicants as the foregoing US patent, in which the glass sheet is rapidly cooled to a temperature below the crystal nuclei formation temperature. Subsequently the temperature is raised to a nuclei formation temperature and then after that still further to a crystallization temperature. Also with this latter method only flat glass or float glass with an equilibrium thickness may be made.

Generally both these methods have the disadvantages of all coupled processes in comparison to uncoupled processes. The methods for glass ceramic production by ceramicizing the sheet have not been put into practice because of the above-described disadvantages.

An entirely different method is described in DE 100 17 701 C2. In that patent document a crystallizable glass is described, which may be drawn to a thickness under the equilibrium thickness and which does not have undesirable crystal nuclei on the underside of the glass sheet, which are formed during the drawing process.

However it has been shown that isolated defects in the form of crystallites are still formed within the glass during the drawing of the glass sheet to a thickness under the equilibrium thickness because of the slow cooling on the float bath that occurs with all glasses. This leads to waste. The cause of this undesirable crystal nucleation during drawing is not known. Possibly it is due to microscopic non-uniformities in the glass mass.

SUMMARY OF THE INVENTION

It is an object of the present invention to provide a float process for making a crystallizable or ceramicizable glass of the above-described kind, with which a fault-free glass with a thickness, which is less than the equilibrium thickness, may be produced.

It is also an object of the present invention to provide a fault-free glass made by a float process, which can be ceramicized, without the above-described disadvantages of the prior art.

These objects, and others that will be come more apparent hereinafter, are attained in a method of making a flat glass that is convertible into a glass ceramic, in which a melted crystallizable glass is supplied in a known way to a metal bath, formed into a continuous glass sheet of a predetermined thickness on the metal bath, conducted through different zones at different temperatures, cooled thereon, and finally continuously drawn off the metal bath.

According to the invention these objects are attained, at least in part, when the glass sheet is drawn to a predetermined thickness below an equilibrium thickness of the melted glass on the metal bath and is cooled from a temperature at which the crystal growth rate in the crystallizable glass is at its maximum (KGmax) to another temperature at which practically no more crystal growth occurs (UEG) with a cooling rate according to formula (I):

$$KR_{UEG}^{KG_{max}} \geq \frac{\Delta T_{UEG}^{KG_{max}}}{100} \cdot KG_{max}, \quad (I)$$

wherein $KR_{UEG}^{KGmax}$ denotes the cooling rate in ° C. min$^{-1}$ for the temperature range between the temperature at which the crystal growth rate is a maximum and the lower devitrification point, i.e. the temperature at which practically no more crystal growth occurs, and
wherein $\Delta T_{UEG}^{KGmax}$ denotes the temperature difference between the temperature at which the crystal growth rate is at a maximum and the lower devitrification point, i.e. the temperature at which practically no more crystal growth occurs, and wherein KGmax denotes the maximum crystal growth rate in μm min$^{-1}$.

Furthermore the float glass according to the invention is convertible into a glass ceramic, has a predetermined thickness that is below an equilibrium thickness of a glass melt on a zinc float bath, has a net width of more than one meter, and contains no more than 50 crystals with a size of not greater than 50 μm per kilogram, the float glass being made from the glass melt.

For an industrial process the glass sheet that is produced usually must have a thickness under the equilibrium thickness, also under about 7 mm and a width of at least 1 m. The "width" is understood to mean the net width, i.e. the usable width of the glass sheet after trimming the edges. The required thickness for crystallizable glass is from 3 to 6 mm, especially 4 to 5 mm. For special purposes, e.g. aircraft glass a sheet with a thickness of from 2 to 8 mm is made. Glass and/or a glass ceramic made from it with this thickness are used, for example, for fire resistant windows, fireplace windows, oven windows, hearth panes, and the like. The usable width of the glass sheet should be as large as possible since a greater width for architectural glazing provides more design possibilities for the architect. Usuable widths of 2 to 3 m and more are possible for float glass without difficulty with current methods according to the dimensions of the float plant.

Considering the crystallization curve of a crystallizable glass, it has been established that crystal growth starts at a certain glass-specific high temperature, the crystal growth rate increases then as the temperature drops from that high temperature, passes through a maximum rate at a certain temperature and then decreases again with further decreases in the temperature, until the crystal growth again stops.

The temperature range, in which the crystallizable glass can be drawn on the float bath to the desired thickness and width by means of the top roller overlaps the temperature range, in which the crystallization of the corresponding crystallizable glass occurs. A conflict of goals thus occurs, since the temperature range, which must be traversed slowly for good formation of glass sheet, is also the temperature range for conventional glass ceramics, which must be traversed rapidly to avoid undesirable crystals growth.

In the temperature range, in which the formation and drawing of the glass occurs, which is from about 1150 to 900° C. for green glass of the SiO$_2$—Al$_2$O$_3$—Li$_2$O (LAS), SiO$_2$—Al$_2$O$_3$—Na$_2$O, and SiO$_2$—Al$_2$O$_3$—MgO systems, the cooling rate should be between 20 and 30° C. min$^{-1}$, in order to guarantee a sufficient quality for the flat glass produced in regard to waviness and thickness variations. Green glass from other glass ceramic systems must, if necessary, be shaped or formed in other temperature ranges, but the cool down rates in the shaping or forming region must always be in the same size range as in above-described systems.

The LAS glass ceramic is the most widely used commercial glass system and has outstandingly small thermal expansion coefficients. It is the preferred system for use in the present method.

The present invention is based on the surprising understanding that in the upper temperature range, i.e. the high temperature range, in which crystal growth starts, down to the temperature at which crystal growth rate has reached a maximum, a low cooling rate does not lead to the occurrence of interfering crystals in the green glass in practice, and that only in the lower temperature range, i.e. from the temperature at which the crystal growth rate has its maximum to the temperature at which the crystal growth has practically ended, is a rapid cooling rate required.

The rate with which this cooling must occur is in accordance with the maximum crystallization rate of the concerned glass ceramic and/or crystallizable glass and must be calculated with the above formula (I):

$$KR_{UEG}^{KG_{max}} \geq \frac{\Delta T_{UEG}^{KG_{max}}}{100} \cdot KG_{max}, \quad (I)$$

wherein $KR_{UEG}^{KGmax}$ denotes the cooling rate in ° C. min$^{-1}$ for the temperature range between the temperature at which the crystal growth rate is a maximum and the lower devitrification point, i.e. the temperature at which practically no more crystal growth occurs, and
wherein $\Delta T_{UEG}^{KGmax}$ denotes the temperature difference between the temperature at which the crystal growth rate is at a maximum and the lower devitrification point, i.e. the temperature at which practically no more crystal growth occurs, and wherein KGmax denotes the maximum crystal growth rate in μm min$^{-1}$.

In the vicinity of the lower devitrification point the crystal growth rate exponentially approaches the value zero. The terminology, "the crystal growth rate practically goes to or approaches zero", means crystal growth rates that are less than or equal to five percent of the maximum crystallization rate.

Measurement of the crystallization rate is well known. The crystallization rate is measured along the formed crystal, also at its greatest extent.

Preferably the cooling rate $KR_{UEG}^{KGmax}$ is at least 1.5 times to 3 times, especially two times, the value of $$\frac{\Delta T_{UEG}^{KG_{max}}}{100} \cdot KG_{max}.$$

It is not necessary that the cooling with the high cooling rate must be started exactly at the temperature at which the crystal growth rate has attained its maximum speed ($T_{KGmax}$), but variations of several degrees are possible. In experiments variations of ±15° C. have practically no negative effect on the process.

Outside of the above-specified temperature range between the maximum crystal growth rate temperature, $T_{KGmax}$, and the lower devitrification point, $T_{UEG}$, the temperature processing method corresponds to the conventional method, which has been known for many years to those skilled in the glass arts.

With the method according to the invention flat glass made by the float process can be converted into a glass ceramic, which has a net width (after cutting off the border) of more than a meter, which has a thickness under the equilibrium thickness and which has no more than 50 crystals per kg of glass with a size of more than 50 μm within the net width. It is preferred however when the when the crystals are not more that 25 μm in size, especially when the crystals are not more than 10 μm in size. The glass preferably does not contain more than 10 crystals per kg of glass, especially not more than 1 crystal per kg of glass, and most preferably not more than 0.1 crystal per kg of glass with the foregoing crystal size.

The float glass of the present invention has a preferred composition, which permits conversion into an LAS glass ceramic, since this glass ceramic has outstanding temperature conversion resistance. This sort of glass from the known LAS system ($Li_2O$—$Al_2O_3$—$SiO_2$) contains (in % by weight on an oxide basis): $Li_2O$, 2 to 5.5; $Al_2O_3$, 15-26; and $SiO_2$, 50 to 75 besides at least 2% by weight crystal nuclei formers, such as $TiO_2$, $ZrO_2$, $P_2O_5$, $SnO_2$, or mixtures thereof, as well as coloring ingredients as needed.

The glass of the present invention has a composition (in % by weight on an oxide basis) of $Li_2O$, 3 to 5; $Al_2O_3$, 15-25; $SiO_2$, 50 to 75; $TiO_2$, 1 to 5; $ZrO_2$, 1 to 2.5; $SnO_2$, 0 to 1; MgO, 0.1 to 2.5; $Na_2O$, 0 to 1.5; $K_2O$, 0 to 1.5; CaO, 0 to 2; SrO, 0 to 2; BaO, 0 to 3; with a sum total of $TiO_2+ZrO_2+SnO_2$ of from 2.5 to 5% by weight; and a sum total of $Na_2O$ and $K_2O$ amounts to 0.2 to 2. In addition the glass of the present invention includes color-imparting ingredients, such as V—, Cr—, Mn—, Fe—, Co—, Cu—, Ni—, Se—, U-compounds, or mixtures thereof.

BRIEF DESCRIPTION OF THE DRAWING

The objects, features and advantages of the invention will now be illustrated in more detail with the aid of the following description of the examples of the method of the invention, with reference to the accompanying figures in which.

EXAMPLE 1

This example of the method was performed with a glass melt with a composition (in % by weight on an oxide basis): 66.1, $SiO_2$; 22.4, $Al_2O_3$; 4.1, $Li_2O$; 0.6, $Na_2O$; 0.2, $K_2O$; 1.0, MgO; 1.3, $P_2O_5$; 1.5, $TiO_2$; 2.0, $ZrO_2$; 0.4, $SnO_2$; and 0.3, ZrO.

Figure 2:
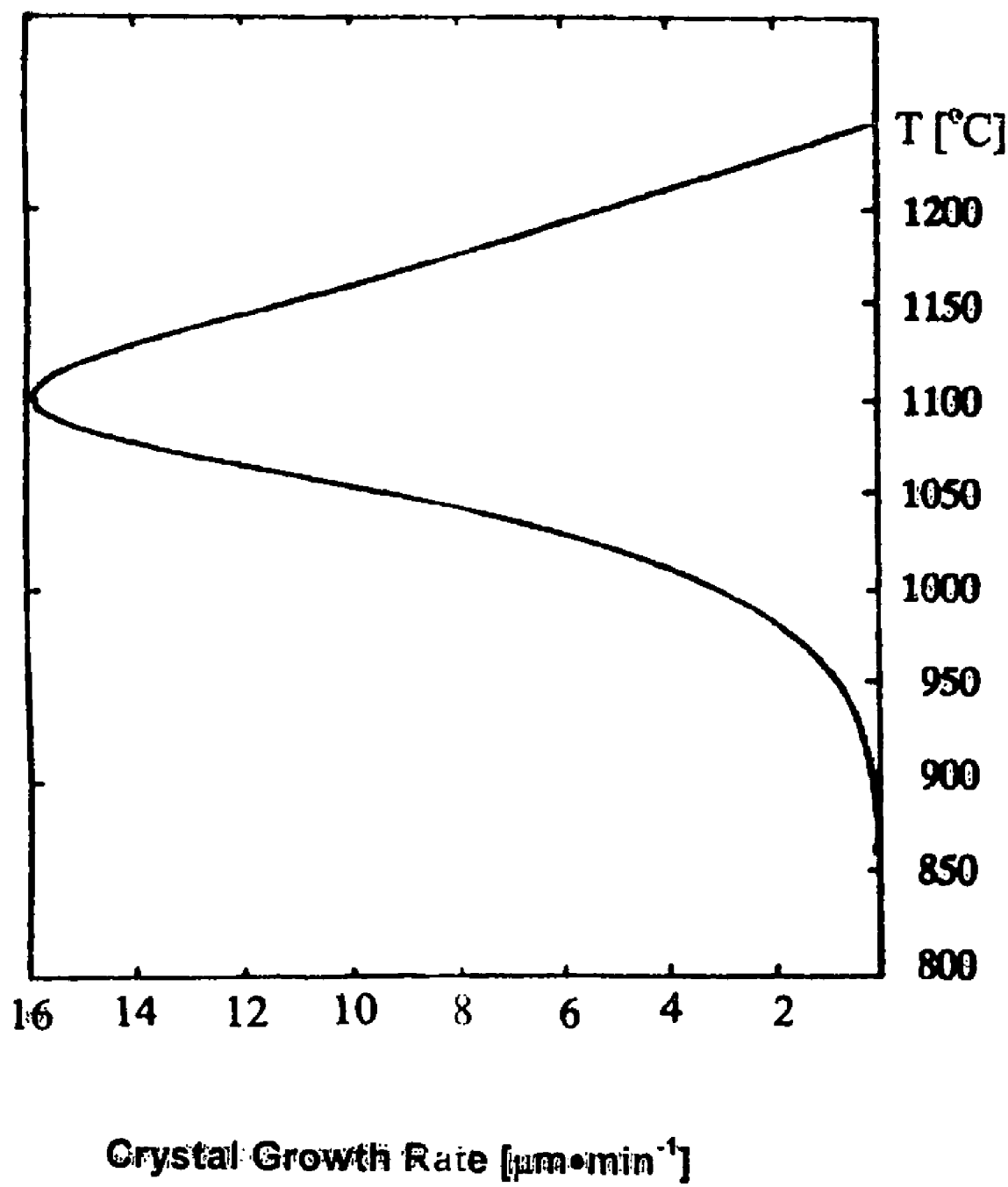
FIG. 2 is a graphical illustration showing the dependence of the crystal growth rate of a glass with the composition of the glass used in example 1 on temperature.

In a preliminary experiment the crystal growing rate was measured in a glass with the above-described composition at different temperatures. The results are shown in FIG. 2. A maximum crystal growing rate, KGmax, of 16 μm min$^{-1}$ was found at maximum crystal growth rate temperature of 1115° C. The lower devitrification point, UEG, at which the crystal growth has practically stopped, is at about 915° C. A ΔT between $T_{KGmax}$ and $T_{UEG}$ of 200° C. results from these values. The cooling rate between 915° C. and 1115° C. calculated according to formula (I) is:

$$KR_{UEG}^{KG_{max}} \geq \frac{200}{100} \cdot 16 = 32°C\,min^{-1}$$

For this example 1.5 times this cooling rate, namely 48° C. min$^{-1}$, was used.

Figure 1:
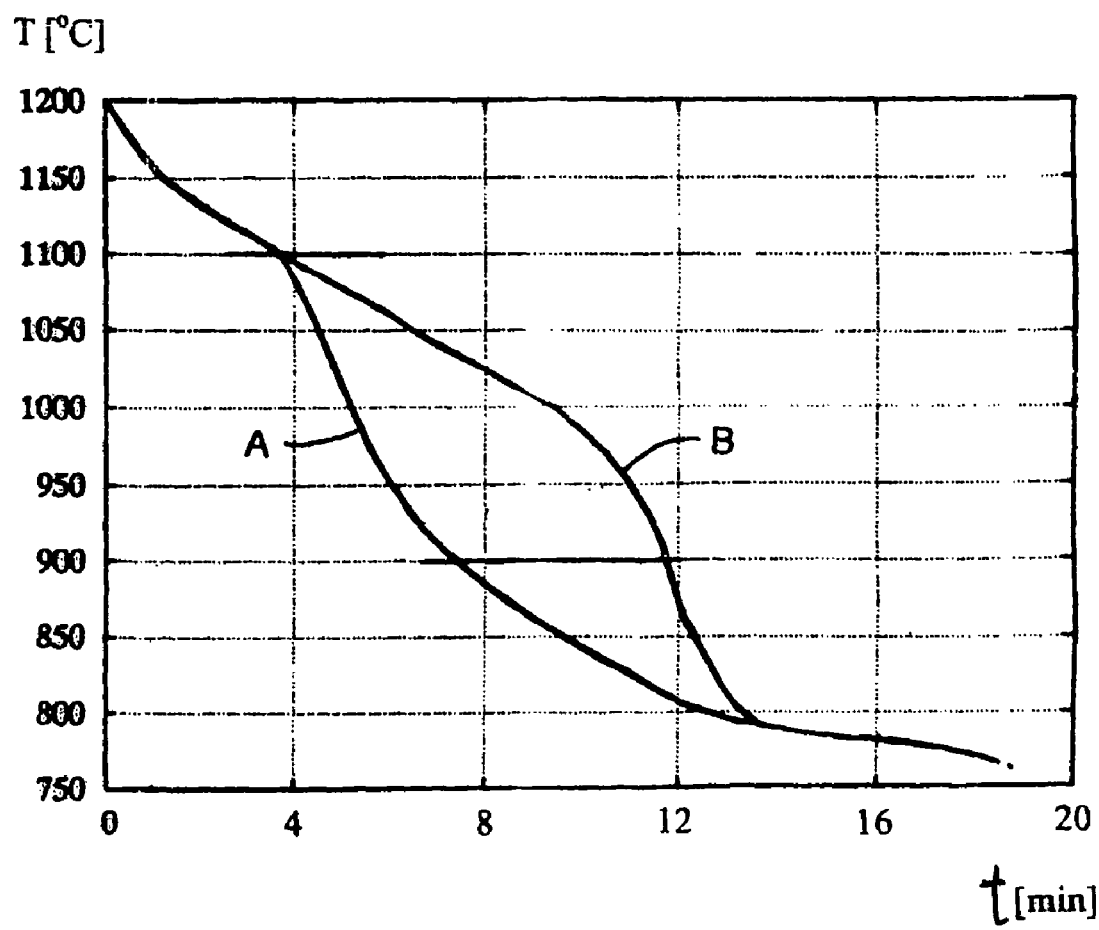
FIG. 1 is a comparative graphical illustration showing the dependence of the temperature on time during cooling in the method according to the invention (curve A) and during cooling in a method of the prior art (curve B)

The glass melt was poured on the float bath and had a temperature of about 1200° C. at the end of the restrictor tile, as shown in FIG. 1. In the following hot spread region the glass was easily cooled further and reached a temperature of about 1145° C. in the forming region, where it was drawn to a glass sheet with a net width of about 180 cm and a thickness of 4 mm. In the temperature range to about 1100° C. the greatest shaping took place, and in this temperature range the sheet was cooled with an average cooling rate of about 29° C. and shaped. A high quality glass sheet was produced by the slow cooling in this temperature range. The glass sheet was cooled down from a temperature of about 1100° C., at which the maximum crystal growth rate occurred in the glass, to a temperature of about 900° C. with a cooling rate of 48° C. min$^{-1}$. After that the glass sheet was cooled further with the conventional moderate cooling rate and further treated as usual. This part of the treatment below about 750° C. is no longer illustrated. The cooling curve according to the invention is curve A in FIG. 1. The glass sheet so made contains no crystals with a size of more than 10 μm.

EXAMPLE 2

Comparative

Example 1 was repeated but with the difference, that, as shown in curve B of FIG. 1, in the entire forming region the glass sheet was cooled with a cooling rate of about 29° C. min$^{-1}$. The time, at which the glass sheet is in a crystallization endangered temperature range (to about 950° C.), was more than twice as long. The glass sheet contained crystals with a size of more than 50 μm.

In both examples the behavior of the temperature in the range below 750° C. was not illustrated, since in that range the dependence of the temperature on time is the same as in the conventional prior art methods.

FIGS. 1 and 2 have the same temperature axis in both figures.

While the invention has been illustrated and described as embodied in a method of making a float glass convertible into a glass ceramic and float glass made thereby, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of making a flat glass that is subsequently convertible into a glass ceramic, said method comprising the steps of:
   a) feeding melted crystallizable glass of a predetermined composition onto a metal bath;
   b) forming a continuous glass sheet of a predetermined thickness on the metal bath from the melted crystallizable glass of the predetermined composition on the metal bath by drawing the glass sheet, so that said predetermined thickness is less than an equilibrium thickness of the melted crystallizable glass on the metal bath;

c) conducting the glass sheet through different zones, said different zones having different temperatures;

d) cooling the glass sheet during passage through said zones from an upper temperature to a lower devitrification point (UEG) of the crystallizable glass with a first cooling rate according to formula (I):

$$KR_{UEG}^{KG_{\max}} \geq \frac{\Delta T_{UEG}^{KG_{\max}}}{100} \cdot KG_{\max}, \qquad (I)$$

wherein said upper temperature is in a temperature range from 15° C. above a temperature ($T_{KGmax}$) at which a crystal growth rate in the glass sheet is maximum to 15° C. below said temperature ($T_{KGmax}$) and wherein $KR_{UEG}^{KGmax}$ denotes the first cooling rate in ° C. min$^{-1}$ for said temperature range between said upper temperature and said lower devitrification point, $\Delta T_{UEG}^{KGmax}$ denotes a temperature difference between said upper temperature and said lower devitrification point, and KGmax denotes a maximum value of said crystal growth rate in μm min$^{-1}$ at said temperature ($T_{KGmax}$) at which said crystal growth rate is maximum;

e) during the forming of the glass sheet by the drawing, cooling the melted crystallizable glass on the metal bath at temperatures above said upper temperature with a second cooling rate that is smaller than said first cooling rate; and f) subsequently continuously drawing the glass sheet off the metal bath;

whereby said flat glass is formed.

2. The method as defined in claim 1, wherein said first cooling rate, $KR_{UEG}^{KGmax}$, is greater than or equal to $1.5 \cdot \Delta T_{UEG}^{KGmax} \cdot KG_{max} \cdot 0.01$.

3. The method as defined in claim 1, wherein said first cooling rate, $KR_{UEG}^{KGmax}$, is greater than or equal to $2.0 \cdot \Delta T_{UEG}^{KGmax} \cdot KG_{max} 0.01$.

4. The method as defined in claim 1, wherein said flat glass made by the method contains no more than 50 crystals with a size of not greater than 50 μm per kilogram.

5. The method as defined in claim 1, wherein said flat glass made by the method contains no more than 50 crystals with a size of not greater than 10 μm per kilogram.

6. The method as defined in claim 1, wherein said melted crystallizable glass is of a glass system selected from the group consisting of a SiO$_2$—Al$_2$O$_3$—Li$_2$O system, a SiO$_2$—Al$_2$O$_3$—Na$_2$O system or a SiO$_2$—Al$_2$O$_3$—MgO system and said second cooling rate is from 20° C. min$^{-1}$ to 30° C. min$^{-1}$, in order to guarantee sufficient quality regarding waviness and thickness variations in the glass sheet.

7. The method as defined in claim 1, further comprising measuring a crystal growth rate in a glass sample of said predetermined composition as a function of temperature and subsequently determining said maximum value (KGmax) of said crystal growth rate in said glass sample and said temperature ($T_{KGmax}$) of said glass sample at which said crystal growth rate is maximum from a dependence of said crystal growth rate measured during the measuring on said temperature.

8. A method of making a flat glass that is subsequently convertible into a glass ceramic, said method comprising the steps of:

a) feeding melted crystallizable glass of a predetermined composition onto a metal bath;

b) forming a continuous glass sheet of a predetermined thickness on the metal bath from the melted crystallizable glass of the predetermined composition on the metal bath by drawing the glass sheet, so that said predetermined thickness is less than an equilibrium thickness of the melted crystallizable glass on the metal bath;

c) conducting the glass sheet through different zones, said different zones having different temperatures;

d) cooling the glass sheet during passage through said zones from an upper temperature to a lower devitrification point (UEG) of the crystallizable glass with a first cooling rate according to formula (I):

$$KR_{UEG}^{KG_{\max}} \geq \frac{\Delta T_{UEG}^{KG_{\max}}}{100} \cdot KG_{\max}, \qquad (I)$$

wherein said upper temperature is in a temperature range from 15° C. above a temperature ($T_{KGmax}$) at which a crystal growth rate in the lass sheet is maximum to 15° C. below said temperature ($T_{KGmax}$) and wherein $KR_{UEG}^{KGmax}$ denotes the first cooling rate in ° C. min$^{-1}$ for said temperature range between said upper temperature and said lower devitrification point, $\Delta T_{UEG}^{KGmax}$ denotes a temperature difference between said upper temperature and said lower devitrification point and KGmax denotes a maximum value of said crystal growth rate in μm min$^{-1}$ at said temperature ($T_{KGmax}$) at which said crystal growth rate is maximum;

e) during the forming of the glass sheet by the drawing, cooling the melted crystallizable glass on the metal bath at temperatures above said upper temperature with a second cooling rate that is smaller than said first cooling rate and f) subsequently continuously drawing the glass sheet off the metal bath;

wherein said predetermined composition of said glass comprises, in percent by weight on an oxide basis, Li$_2$O, 3 to 5; Al$_2$O$_3$, 15 to 25; SiO$_2$, 50 to 75; TiO$_2$, 1 to 5; ZrO$_2$, 1 to 2.5; SnO$_2$, 0 to 1; MgO, 0.1 to 2.5; Na$_2$O, 0 to 1.5; K$_2$O, 0 to 1.5; CaO, 0 to 2; SrO, 0 to 2; BaO, 0 to 3; and wherein Σ TiO$_2$+ZrO$_2$+SnO$_2$ is from 2.5 to 5 percent by weight; Σ Na$_2$O+K$_2$O amounts to from 0.2 to 2 percent by weight; and including color-imparting compounds containing elements, said elements being selected from the group consisting of V, Cr, Mn, Fe, Co, Cu, Ni, Se and U, or mixtures thereof.

9. A method of making a flat glass that is subsequently convertible into a glass ceramic, said method comprising the steps of:

a) feeding melted crystallizable glass of a predetermined composition onto a metal bath;

b) forming a continuous glass sheet of a predetermined thickness on the metal bath from the melted crystallizable glass of the predetermined composition on the metal bath by drawing the glass sheet so that said predetermined thickness is less than an equilibrium thickness of the melted crystallizable glass on the metal bath;

c) conducting the glass sheet through different zones, said different zones having different temperatures;

d) cooling the glass sheet during passage through said zones from an upper temperature to a lower devitrification point (UEG) of the crystallizable glass with a first cooling rate according to formula (I):

$$KR_{UEG}^{KG\max} \geq \frac{\Delta T_{UEG}^{KG\max}}{100} \cdot KG_{\max}, \quad (I)$$

wherein said upper temperature is in a temperature range from 15° C. above a temperature ($T_{KGmax}$) at which a crystal growth rate in the glass sheet is maximum to 15° C. below said temperature ($T_{KGmax}$) and wherein $KR_{UEG}^{KGmax}$ denotes the first cooling rate in ° C. min$^{-1}$ for said temperature range between said upper temperature and said lower devitrification point, $\Delta T_{UEG}^{KGmax}$ denotes a temperature difference between said upper temperature and said lower devitrification point and KGmax denotes a maximum value of said crystal growth rate μm min$^{-1}$ at said temperature ($T_{KGmax}$) at which said crystal growth rate is maximum;

e) during the forming of the glass sheet by the drawing, cooling the melted crystallizable glass on the metal bath at temperatures above said upper temperature with a second cooling rate that is smaller than said first cooling rate; and f) subsequently continuously drawing the glass sheet off the metal bath;

wherein said predetermined composition of said glass comprises, in percent by weight on an oxide basis, $Li_2O$, 2 to 5.5; $Al_2O_3$, 15 to 26; $SiO_2$, 50 to 75; and at least 2 percent by weight of at least one crystal nuclei former selected from the group consisting of $TiO_2$, $ZrO_2$, $P_2O_5$ and $SnO_2$.

* * * * *